(12) United States Patent
Fu et al.

(10) Patent No.: US 9,962,982 B2
(45) Date of Patent: May 8, 2018

(54) MEDIUM WITH INK RECEIVING AND OPACITY CONTROL LAYERS

(75) Inventors: Xulong Fu, San Diego, CA (US); Christine E. Steichen, Escondido, CA (US); Lokendra Pal, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 527 days.

(21) Appl. No.: 14/374,074

(22) PCT Filed: Mar. 27, 2012

(86) PCT No.: PCT/US2012/030663
§ 371 (c)(1),
(2), (4) Date: Jul. 23, 2014

(87) PCT Pub. No.: WO2013/147747
PCT Pub. Date: Oct. 3, 2013

(65) Prior Publication Data
US 2015/0024181 A1    Jan. 22, 2015

(51) Int. Cl.
| | |
|---|---|
| B32B 7/02 | (2006.01) |
| B32B 15/082 | (2006.01) |
| B32B 15/095 | (2006.01) |
| B32B 3/26 | (2006.01) |
| B05D 5/06 | (2006.01) |

(Continued)

(52) U.S. Cl.
CPC ............. *B41M 5/52* (2013.01); *B29C 47/065* (2013.01); *B32B 7/12* (2013.01); *B32B 27/06* (2013.01); *B32B 27/18* (2013.01); *B32B 27/20* (2013.01); *B29K 2101/12* (2013.01); *B29K 2105/0061* (2013.01); *B29K 2995/0018* (2013.01); *B32B 37/08* (2013.01); *B32B 37/153* (2013.01); *B32B 2264/10* (2013.01); *B32B 2274/00* (2013.01); *B32B 2305/026* (2013.01); *B32B 2305/30* (2013.01); *B32B 2307/41* (2013.01); *B32B 2307/412* (2013.01); *B32B 2307/726* (2013.01); *B32B 2307/75* (2013.01); *B32B 2590/00* (2013.01); *Y10T 428/24942* (2015.01);

(Continued)

(58) Field of Classification Search
None
See application file for complete search history.

(56) References Cited

U.S. PATENT DOCUMENTS 4,309,247 A * 1/1982 Hou ...................... B01D 39/18
                                                                     162/149
4,460,637 A    7/1984 Miyamoto et al.
(Continued)

FOREIGN PATENT DOCUMENTS

| EP | 0545470 | 6/1993 |
|---|---|---|
| EP | 1275516 A1 | 1/2003 |
| WO | WO-2012105939 A1 | 8/2012 |

OTHER PUBLICATIONS

Creative Mechansims Blog, "Everything You Need to Know About Polycarbonate," Aug. 26, 2015.*

*Primary Examiner* — David Sample
*Assistant Examiner* — Nicole T Gugliotta
(74) *Attorney, Agent, or Firm* — Dierker & Kavanaugh, P.C.

(57) ABSTRACT

A graphics medium may have an ink receiving layer with at least fifty percent hydrogel by weight and an opacity control layer with a polymer embedded with at least one filler material.

19 Claims, 4 Drawing Sheets

(51) Int. Cl.
*B05D 1/26* (2006.01)
*B41M 5/52* (2006.01)
*B32B 7/12* (2006.01)
*B32B 27/06* (2006.01)
*B32B 27/18* (2006.01)
*B29C 47/06* (2006.01)
*B32B 27/20* (2006.01)
*B32B 37/08* (2006.01)
*B32B 37/15* (2006.01)
*B29K 101/12* (2006.01)
*B29K 105/00* (2006.01)

(52) U.S. Cl.
CPC .. *Y10T 428/249953* (2015.04); *Y10T 428/273* (2015.01); *Y10T 428/31551* (2015.04)

(56) References Cited

U.S. PATENT DOCUMENTS

| | | | |
|---|---|---|---|
| 5,176,954 A | 1/1993 | Keller et al. | |
| 5,190,805 A | 3/1993 | Atherton et al. | |
| 5,693,414 A | 12/1997 | Peiffer et al. | |
| 5,824,623 A * | 10/1998 | Kawai | B41M 5/5254 428/341 |
| 5,888,629 A * | 3/1999 | Lubar | B41M 5/502 428/32.24 |
| 6,146,770 A | 11/2000 | Sargeant et al. | |
| 6,589,636 B2 | 7/2003 | Emslander et al. | |
| 6,790,491 B2 | 9/2004 | Sebastian et al. | |
| 6,913,801 B2 * | 7/2005 | Kim | B41M 5/506 428/32.25 |
| 7,087,275 B2 | 8/2006 | Baker et al. | |
| 7,264,856 B2 * | 9/2007 | Wexler | B41M 5/506 347/101 |
| 7,562,957 B2 | 7/2009 | Mills et al. | |
| 7,655,291 B2 | 2/2010 | Ye | |
| 7,867,603 B2 | 1/2011 | Dontula et al. | |
| 7,906,218 B2 | 3/2011 | Steichen et al. | |
| 7,935,398 B2 | 5/2011 | Park et al. | |
| 2003/0157277 A1 | 8/2003 | Romano, Jr. et al. | |
| 2004/0185193 A1 | 9/2004 | Taka et al. | |
| 2008/0090033 A1 | 4/2008 | Fu et al. | |
| 2008/0166507 A1 * | 7/2008 | Park | B41M 5/502 428/32.1 |
| 2009/0068442 A1 * | 3/2009 | Mitsui | B41M 5/506 428/331 |
| 2013/0306259 A1 * | 11/2013 | Fu | B41M 5/508 162/137 |

* cited by examiner

MEDIUM WITH INK RECEIVING AND OPACITY CONTROL LAYERS

BACKGROUND

Generally, backlit and frontlit signs include an image that is imposed on a graphics medium having some degree of transparency. Often, the medium's core material is transparent or translucent, and the overall opacity of the medium is controlled to allow ample amounts of light through the medium. Backlit or frontlit signs are generally displayed at airports, bus stops, train terminals, museums, movie theaters and other public venues.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

One example of a medium for backlit signage can manufactured as follows. First, an aqueous coating is applied to a front side of the medium and allowed to dry. As the coating's liquid evaporates from the surface of the medium, binders, pigments, additives, and other coating constituents are left behind to form a dried ink receiving layer. The aqueous coating may be applied through slotted die applications, roller applications, fountain curtain applications, blade applications, rod applications, air knife applications, gravure application, air brush application, or combinations thereof. The coating may be dried through convection, conduction, atmospheric conditions, or combinations thereof.

An image is then formed when ink or toner is selectively deposited onto the ink receiving coating. A pigment or dye in the ink bonds with the constituents of the coating and a carrier fluid of the ink evaporates. The rate of evaporation affects the quality of the image. Generally, the longer the carrier fluid takes to evaporate the more likely that the colorant will wick away from the position where the colorant first made contact with the coating. Some wicking or spreading can be desirable to allow the colorants from the different ink drops to spread into one another to form a continuous image. Too much wicking, however, will degrade the image.

Contrary to this example, the present specification describes principles including, for example, a graphics medium that does not use an aqueous mixture to form an ink receiving layer for use in backlit or frontlit images. Examples of such a graphics medium may have a plurality of layers including an ink receiving layer with at least fifty percent hydrogel by weight and an opacity control layer with a polymer embedded with at least one filler material.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
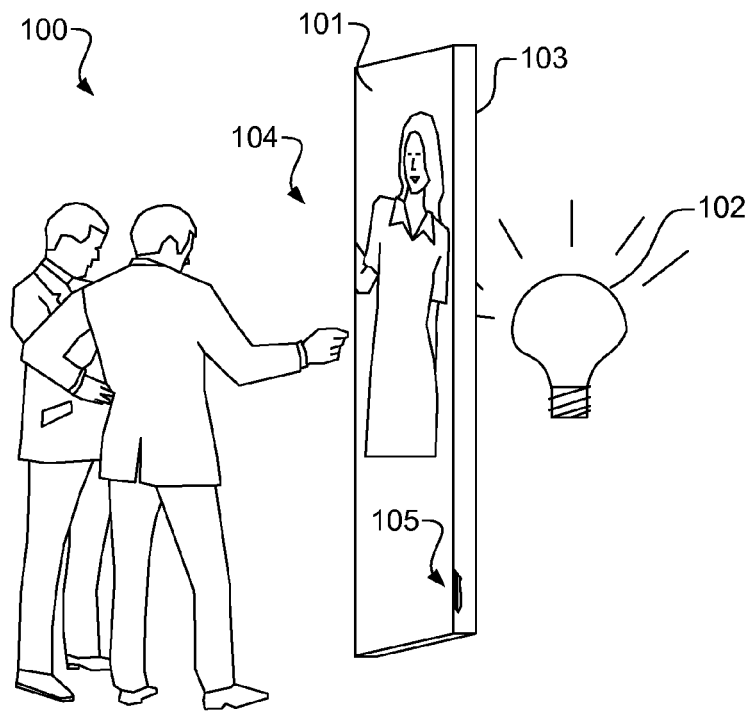
FIG. 1 is a diagram of an illustrative graphics medium, according to principles described herein.

FIG. 1 is a diagram of an illustrative graphics medium (100), according to principles described herein. In this example, the graphics medium (100) contains an image (104) viewable from a front side (101). The graphics medium (100) has some amount of transparency that allows visible light to pass through the medium. In some examples, visible light from a light source (102) located proximate to a backside (103) of the medium (100) illuminates the image (104).

In some examples, the graphics medium (100) has a reflective layer disposed on the medium's backside (103). The reflective layer may reflect light entering the graphics medium (100) from the front side (101) back through the medium's thickness. The reflected light may also illuminate the image (104). Incoming light from the front side (101) may include daylight, light bulbs, light intended to illuminate the image, and combinations thereof.

The medium may not be completely transparent. For example, the medium may have an overall opacity between forty to ninety percent per Tappi test method T425. As light travels through the medium, the overall diffusion properties of the medium may scatter visible light, thereby distributing the light through a greater portion of the medium and improving the illumination of the image.

Opacity, as measured by the Tappi test method T425, is a ratio of the medium's reflectances. One side of the ratio includes the medium's reflectance when the medium is backed against a black body. The other side of the ratio includes the reflectance of the medium when backed against a white body with a standard reflectance of eighty nine percent. The medium's opacity is influenced by the medium's thickness, material type, filler volume percentage, filler material disposed within the medium's layers, the amount of bleaching of the medium's constituents, the opacity material's density, coatings, and other factors.

In the example of FIG. 1, the graphics medium (100) has a plurality (105) of layers. The plurality of layers includes an ink receiving layer, an opacity control layer, and a base layer.

Figure 2:
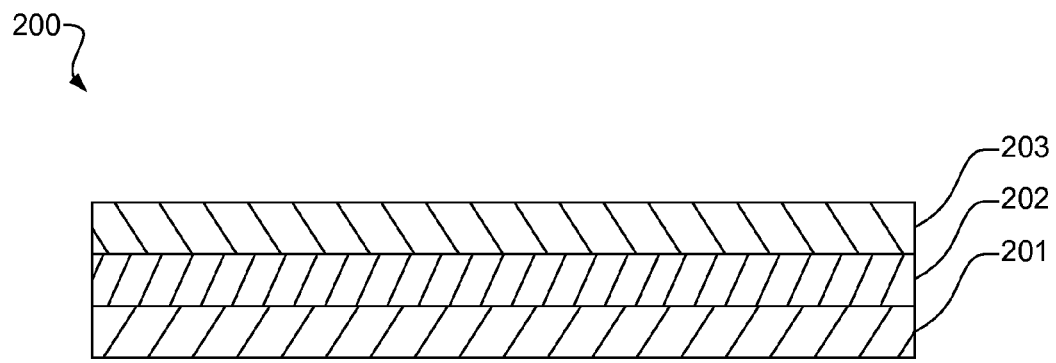
FIG. 2 is a cross sectional diagram of an illustrative graphics medium, according to principles described herein.

FIG. 2 is a cross sectional diagram of an illustrative graphics medium (200), according to principles described herein. In this example, a base layer (201) is made of base materials, described in more detail below. An opacity control layer (202) is formed on the base layer (201), and an ink receiving layer (203) is formed on the opacity control layer (202).

The base layer (201) may be made of plastic films, thermoplastic plastic material, polymers, polypropylene, fibers, translucent materials, or combinations thereof. The base layer may provide support to the other layers and contribute to overall properties of the medium including stiffness, opacity, brightness, thickness, elasticity, other properties, and combinations thereof.

The opacity control layer (202) may contain sixty to ninety percent of thermal plastic polymer such as polyolefin and ten to forty percent of a filler material. The thermal plastic polymer may include polypropylene, polyethylene, starch, polylactic acid, polyhydroxyalkanoates, biodegradable polyesters, or combinations thereof.

The filler material may have opaque properties that limit the amount of light through the medium. This can contribute to the overall opacity of the medium. The filler material may be mineral fillers, wollastonite, clay, titanium dioxide, calcium carbonate, kaolin clay, silicates, plastics pigment, alumina trihydrate, talc, other fillers, or combinations thereof.

In addition to the opacity control layer's percentage of filler material, the layer's weight may also affect its opacity. In some examples, the opacity control layer has a basis weight of ten to thirty grams per square meter (gsm).

The opacity control layer (202) may be extruded onto the base layer (201). In some examples, the opacity control layer (202) and the base layer (201) are coextruded together. In some examples, the extrusion is a hot melt extrusion, where the materials of the opacity control layer are heated to a temperature sufficient to melt the opacity control layer's constituents, and the layer is extruded into place while in a melted form. As the extruded layer cools, the extruded layer hardens in place. In other examples, the opacity layer is a laminate layer.

The ink receiving layer (203) may be composed of at least fifty percent of a hydrogel material. Such a hydrogel material may include a material that is hydrophilic and is capable of absorbing moisture. The ink receiving layer (203) may absorb the ink or just certain constituents of the ink, such as the colorant. During absorption, the hydrogel of the ink receiving layer may slightly increase its volume. In some examples, the hydrogel is a network of hydrophilic polymers. The hydrogel may include thermoplastic polyurethane, polyvinyl alcohol, ethylene vinyl alcohol, ethylene vinyl acetate, absorbent salts, other hydrogels, or combinations thereof. In some examples, the hydrogel is a mixture with a predominate substance capable of absorbing moisture.

In some examples, the hydrogel is an aliphatic thermoplastic polyurethane. One aliphatic thermoplastic polyurethane that may be compatible with the principles described herein includes Tecophilic® available from Lubrizol Advanced Materials, Inc. headquartered in Cleveland, Ohio.

The remainder of the layer may include functional additives, such as polyethylene, polyethylene oxide, polyacrylamides, polyolefins, cellular-based polymers, silica, alumina titanium dioxide, calcium carbonate, optical brightening agents, dyes, pigments, fixatives, release agents, optical agents, rheology modifiers, colorant fixatives, other additives, or combinations thereof. The functional additives may affect various characteristics of the ink receiving layer, such as optical characteristics, color characteristics, printability characteristics, other characteristics, and combinations thereof.

The ink receiving layer (203) may be extruded onto the opacity control layer (202). In some examples, the opacity control layer (202) and the ink receiving layer (203) are coextruded together. In some examples, the ink receiving layer is hot melt extruded, and the ink receiving hardens into a layer that acts as a solid as it cools in place after extrusion. As a consequence, the functional additives are dispersed throughout the ink receiving layer (203).

The ink receiving layer may have the capability to absorb water by at least fifty percent of its dry weight. In some examples, the ink receiving layer has the capability to absorb over 100 percent of its dry weight. Further, in some examples, the ink receiving layer has the capability to absorb over 1000 percent of its dry weight.

In some examples, the ink receiving layer has a total moisture absorption capacity of at least one gram per square meter (gsm). In some examples, the ink receiving layer's moisture absorption capacity is between one and 25 gsm.

In the example of FIG. 2, a layer is bonded to both sides of the opacity control layer (202). In some examples, the opacity control layer (202) is disposed between the base layer (201) and the ink receiving layer (203). In some examples, the opacity control layer (202) is one of a plurality of layers disposed between the ink receiving layer (203) and the base layer (201).

Figure 3:
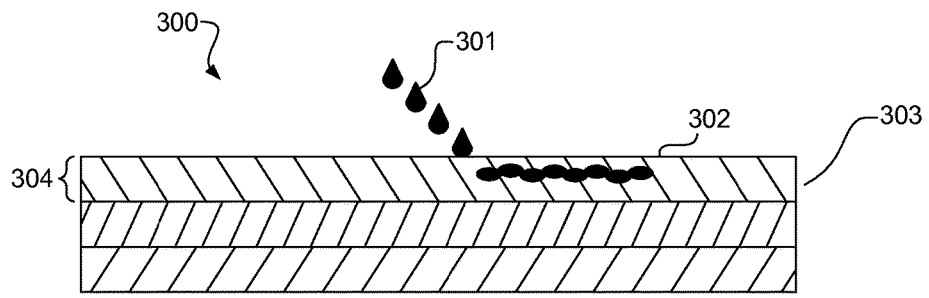
FIG. 3 is a cross sectional diagram of an illustrative graphics medium, according to principles described herein.

FIG. 3 is a cross sectional diagram of an illustrative graphics medium (300), according to principles described herein. In the illustrated example, ink (301) is deposited on a surface (302) of the ink receiving layer (303) and held within a thickness (304) of the ink receiving layer (303).

The ink (301) may have a carrier fluid and a colorant. The colorant may include a dye, pigment, other colorant, or combinations thereof. In some examples, the colorant may have a negative electrostatic charge, which is attracted to a positive electrostatic charge of certain functional additives dispersed throughout the ink receiving layer (303). As the ink (301) is deposited onto the surface (302) of the ink receiving layer (303), the ink (301) is absorbed into the layer's thickness (304) by the hydrogel and held below the layer's surface (302). The functional additives may prevent the colorant from wicking away from the position at which the colorant first contacted within the ink receiving layer, prevent the colorant from bleeding and/or spreading, or otherwise moving its position within the ink receiving layer. As a consequence, the functional additives may help the image maintain a sharp edge and provide a clear contrast between the image and its background.

Holding the ink below the receiving layer's surface (302) improves the durability of the image. In contrast to graphic media where the ink remains on the media's surface as the ink's carrier fluid evaporates, the image formed in the example of FIG. 3 is protected from external forces. For example, by being held beneath the surface (302), the image may be insulated from physical contact that may damage or smear the image, such as an individual touching the ink receiving layer's surface, stacking other medium on top of the ink receiving layer, dropping the medium, other forms of contact, and combinations thereof.

In some examples, the carrier fluid and the colorant are pulled into the hydrogel layer. In some examples, the hydrogel layer pulls in the colorant while leaving the carrier fluid on the ink receiving layer's surface to evaporate. In some examples, little or no evaporation occurs after a drop of ink contacts the ink receiving layer because the ink receiving layer holds all of the moisture from the ink within the ink receiving layer's thickness.

Figure 4:
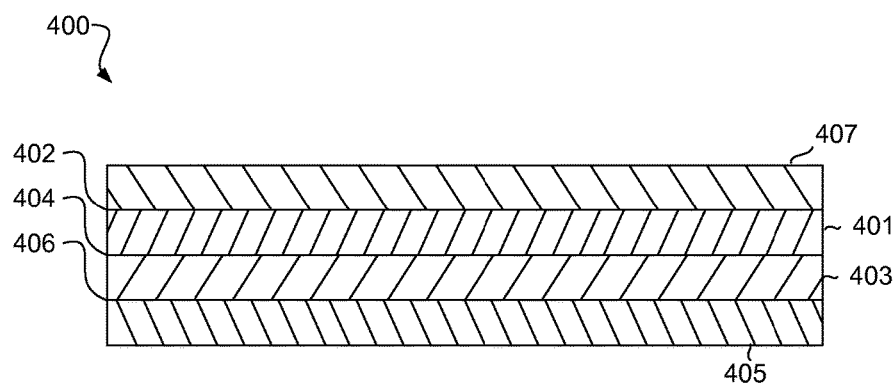
FIG. 4 is a cross sectional diagram of an illustrative graphics medium, according to principles described herein.

FIG. 4 is a cross sectional diagram of an illustrative graphics medium (400), according to principles described herein. In this example, an ink receiving layer (407) is deposited on a base layer (401) on a first side (402). The base layer (401) may be made of a transparent plastic material or transparent raw base material. In this example, an opacity control layer (403) is deposited on a second side (404) of the base layer (401).

Generally, pure wood pulp becomes more transparent as fiber is heavily refined or beaten and becomes denser. In some examples, the base material is made by mixing together wood fibers/pulp and mechanically refining the wood mixture until fluid and air pockets are removed from the mixture. Generally, wood fibers have a tubular structure, and the mechanical refinement collapses the fiber's interior making the fibers flatter and makes the overall mixture denser. Further processing of the resulting mixture in a paper making machine may result in a base material that has some degree of transparency. The resulting base material may be transparent or translucent.

The mechanical refining also modifies the fiber's structure resulting in a more transparent material. In some examples, at least some of the fibers are bleached prior to at least some of the mechanical refinement. Bleaching may remove a brownish tint that is common in unbleached wood pulp.

In some examples, the ink receiving layer (407) is spaced apart from the opacity control layer (403) by a transparent material, such as the base layer (401). In some examples, the base layer (401) is made of a thermoplastic polymer material. In some examples, the ink receiving layer (407) is spaced apart from the opacity control layer (403) by a plurality of layers.

A barrier (405) may also be formed on a backside (406) of the opacity control layer (403) to provide the opacity control layer (403) with protection from external influences. In some examples, the barrier (405) provides additional stiffness to the medium to prevent curling.

In some examples, the ink receiving layer has a porous structure that causes deposited ink on the layer's surface to dry faster than the ink would otherwise dry with the hydrogel alone. The swellable ink receiving layer may provide the image with increased brightness, contrast, and other optical properties by keeping the colorants from spreading. An ink receiving layer made in accordance with the principles described herein may absorb the ink through swelling of the hydrogel material and through capillary action of the pores. As a consequence, the ink receiving layer may exhibit the benefits of both a porous structure and a swellable material.

The strength of the capillary force and specific constituents of the ink that are absorbed through capillary action may be controlled by the pore size and spacing. In some examples, the colorant particles are between 50 and 250 nanometers. In these examples, the pore size may be formed to be larger than 250 nanometers to pull in the colorant particles. In other examples, the pores may be used to separate the carrier fluid from the colorant. In these examples, the pores may be sized to pull in the carrier fluid molecules while the hydrogel absorbs the colorant. Thus, the pore size may aid in separating ink constituents once the ink is deposited on the ink receiving layer. Ink constituents may include colorant, binders, additives, carriers, solvents, pigments, dyes, resins, lubricants, solubilizers, surfactants, particulate matter, fluorescers, and other materials, or combinations thereof.

Figure 5:
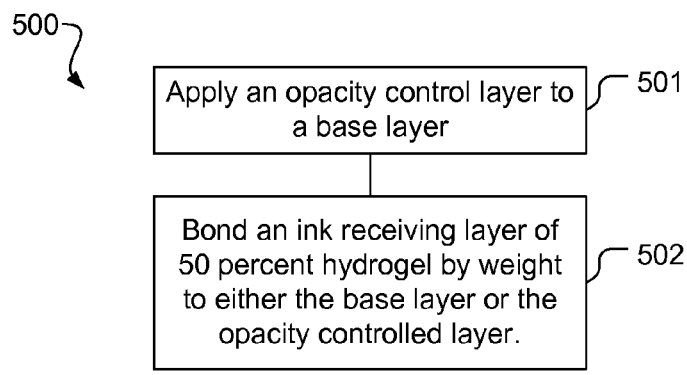
FIG. 5 is a diagram of a flowchart of an illustrative method for forming a graphics medium, according to principles described herein.

FIG. 5 is a flowchart of an illustrative method (500) for forming a graphics medium, according to principles described herein. In this example, the method (500) includes applying (501) an opacity control layer to a base layer; and bonding (502) an ink receiving layer of fifty percent hydrogel by weight to either the base layer or the opacity control layer.

In some examples, the opacity control layer and/or the ink receiving layer is hot melt extruded in place. In some examples, the opacity control layer and the ink receiving layer are coextruded together on the base layer. In some examples, the ink receiving layer is extruded onto either the base layer or the opacity control layer.

Figure 6:
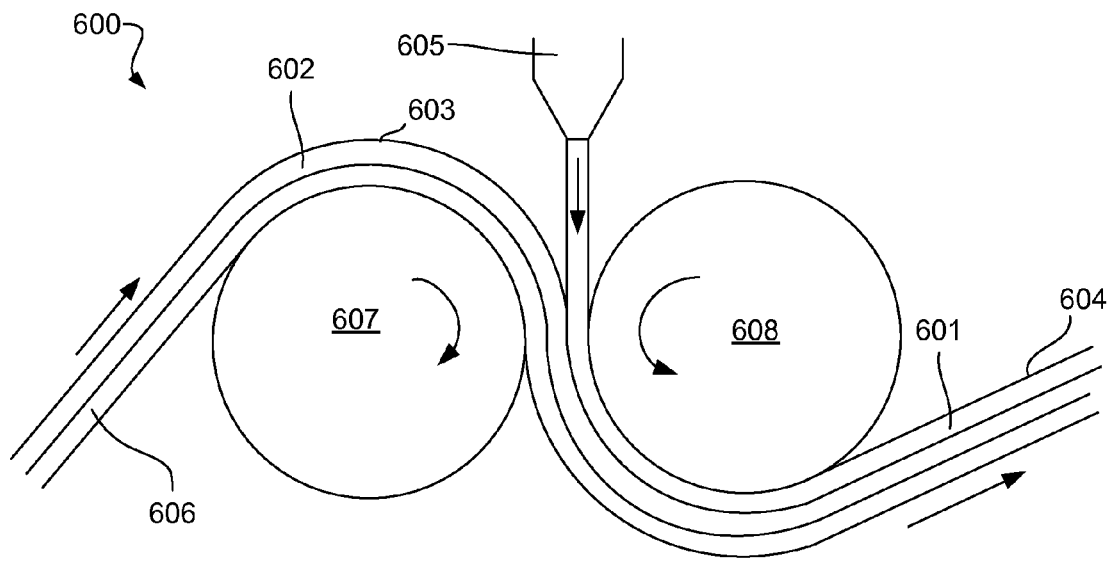
FIG. 6 is a diagram of an illustrative graphics medium, according to principles described herein.

FIG. 6 is a diagram of an illustrative graphics medium (600), according to principles described herein. In this example, an ink receiving layer (601) is in the process of being extruded onto an opacity control layer (602). A temperature of the constituents of the ink receiving layer (601), such as the hydrogel material and functional additives, may be heated to a temperature to collectively melt or soften the ink receiving composition while the material is applied to the surface (603) of the opacity control layer (602). In some examples, the composition is friction heated as the materials are forced through a narrow opening in an extrusion die (605). In other examples, a heat source, such as a resistive heater or flame, is applied to the composition.

In the example of FIG. 6, the ink receiving layer (601) is dispensed through an extrusion die (605) as the opacity control layer (602) and the substrate (606) are conveyed between a set of rollers (607, 608). The placement of the rollers (607, 608) presses the layers (601, 602, 606) together. This pressure promotes bonding between the ink receiving layer (601) and the opacity control layer (602). Further, the spacing between the rollers (607, 608) forms a uniform thickness in the ink receiving layer (601).

Roller (608), which contacts the surface (604) of the ink receiving layer (601), may be actively cooled to draw heat from the ink receiving layer (601) after it binds to the opacity control layer (602). As the ink receiving composition cools, the ink receiving layer (601) solidifies.

Figure 7:
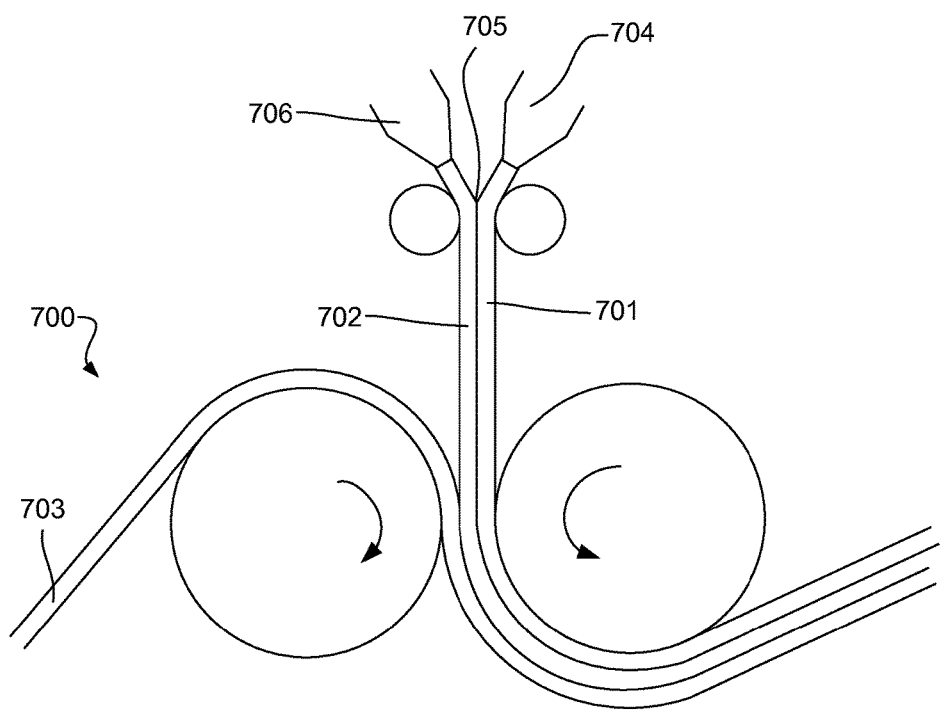
FIG. 7 is a diagram of an illustrative graphics medium, according to principles described herein.

FIG. 7 is a diagram of an illustrative graphics medium (700), according to principles described herein. In this example, ink receiving layer (701) and an opacity control layer (702) are coextruded onto a base layer (703) of the medium (700).

In this example, the opacity control layer (702) has a basis weight of five to forty grams per square meter. In some examples, the opacity control layer (702) has a basis weight of ten to thirty grams per square meter. In some examples, the opacity control layer (702) has a basis weight of fifteen to twenty grams per square meter.

In this example, the ink receiving material (701) has a basis weight of five to fifty grams per square meter. In some examples, the ink receiving material (701) has a basis weight of fifteen to thirty five grams per square meter. In some examples, the ink receiving material (701) has a basis weight of twenty to twenty five grams per square meter.

In some examples, the opacity control layer constituents and the ink receiving layer constituents are heated separately and pushed through a separate extrusion dies (704, 706). In the example of FIG. 7, as the layers (701, 702) extrude they come together and form a bond (705). Hot melt coextruding any of the layers (701, 702) together may result in a reduced processing time, an increased bond strength, a more precise uniform thickness of the layers (701, 702), and combinations thereof.

In some examples, the ink receiving layer has a plurality of sub-layers that are coextruded together. Each sub-layer may have different types and/or amounts of certain functional additives. In some examples, a top most sub-layer is formed with a pore forming material while an under sub-layer is formed without pore forming materials.

In some examples, multiple sub-layers of the ink receiving layer are applied separately. A second ink receiving layer may provide the medium with additional stiffness that may reduce or prevent curling of the medium's other layers.

While some of the layers of the graphics medium have been depicted as being hot melt extruded separately or coextruded with another layer, any combination of extrusion, coextrusion, or combinations thereof is included within the scope of the principles described herein. In some examples, each layer of the medium is extrudable. In some examples, all of the medium's layers are hot melt extruded together.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A graphics medium, comprising:
a hot melt extruded ink receiving layer comprising at least fifty percent hydrogel by weight;
an opacity control layer consisting of from sixty to ninety percent by weight of a polymer embedded with from ten to forty percent by weight of at least one filler material; and
a transparent or translucent base layer comprising one of:
a transparent or translucent raw base material; or
a transparent thermoplastic polymer material.

2. The medium of claim 1, wherein said graphics medium comprises an overall opacity of greater than forty percent per Tappi test method T425.

3. The medium of claim 1, wherein said hot melt extruded ink receiving layer and said opacity control layer are bonded to one another.

4. The medium of claim 1, wherein said hot melt extruded ink receiving layer is spaced apart from the transparent or translucent base layer by said opacity control layer.

5. The medium of claim 1, wherein said hot melt extruded ink receiving layer is spaced apart from said opacity control layer by the transparent or translucent base layer.

6. The medium of claim 1, wherein said hot melt extruded ink receiving layer comprises a porous surface structure capable of absorbing ink through a capillary force.

7. The medium of claim 1, wherein said at least one filler material includes calcium carbonate, wollastonite, clay, titanium dioxide, or combinations thereof.

8. The medium of claim 1, wherein said opacity control layer comprises a basis weight of ten to thirty grams per square meter.

9. The medium of claim 1, wherein said ink receiving layer comprises a basis weight of one to twenty-five grams per square meter.

10. A method for forming the graphics medium of claim 1, comprising:
applying the opacity control layer to the transparent or translucent base layer; and
bonding the ink receiving layer of at least fifty percent hydrogel by weight to either said transparent or translucent base layer or said opacity control layer by hot melt extrusion.

11. The method of claim 10, wherein bonding the ink receiving layer to either said transparent or translucent base layer or said opacity control layer includes hot melt coextruding said opacity control layer and ink receiving layer to said transparent or translucent base layer.

12. The method of claim 10, wherein bonding the ink receiving layer to either said transparent or translucent base layer or said opacity control layer includes hot melt extruding said ink receiving layer onto said transparent or translucent base layer.

13. A graphics medium, comprising:
an ink receiving layer comprising at least fifty percent hydrogel by weight;
an opacity control layer consisting of from sixty to ninety percent of a polymer and ten to forty percent of at least one filler material;
a transparent or translucent base layer comprising one of:
a transparent or translucent raw base material; or
a transparent thermoplastic polymer material; and
a bond between said ink receiving layer and said opacity control layer formed from said ink receiving layer and said opacity control layer being hot melt coextruded together onto the transparent or translucent base layer.

14. The medium of claim 13, wherein said opacity control layer comprises a basis weight of ten to thirty grams per square meter and said ink receiving material comprises a basis weight of five to fifty grams per square meter.

15. The medium of claim 1 wherein the transparent or translucent raw base material is mechanically refined wood fibers.

16. The medium of claim 1 wherein:
the polymer of the opacity control layer is selected from the group consisting of polypropylene, polyethylene, polylactic acid, polyhydroxyalkanoates, biodegradable polyesters, and combinations thereof; and
the hydrogel of the hot melt extruded ink receiving layer is selected from the group consisting of thermoplastic polyurethane, polyvinyl alcohol, ethylene vinyl alcohol, ethylene vinyl acetate, and combinations thereof.

17. The medium of claim 1 wherein the ink receiving layer includes polyethylene, polyethylene oxide, polyacrylamides, polyolefins, cellular-based polymers, silica, alumina titanium dioxide, calcium carbonate, optical brightening agents, dyes, pigments, fixatives, release agents, optical agents, rheology modifiers, colorant fixatives, or combinations thereof.

18. The medium of claim 1 wherein the hydrogel is an aliphatic thermoplastic polyurethane.

19. The medium of claim 1 wherein a remainder of the hot melt extruded ink receiving layer includes a functional additive selected from the group consisting of polyethylene, polyethylene oxide, polyacrylamides, polyolefins, cellular-based polymers, silica, alumina titanium dioxide, calcium carbonate, optical brightening agents, dyes, pigments, fixatives, release agents, optical agents, rheology modifiers, colorant fixatives, and combinations thereof.

* * * * *